March 10, 1931.   W. LINDNER   1,795,368
MULTIPLE SPEED WHEEL GEAR
Filed Dec. 6, 1927   2 Sheets-Sheet 2

Inventor:
W. Lindner
By: Marks & Clerk
Attys.

Patented Mar. 10, 1931

1,795,368

UNITED STATES PATENT OFFICE

WALTHER LINDNER, OF DUSSELDORF-GRAFENBERG, GERMANY, ASSIGNOR, BY MESNE ASSIGNMENTS, TO FRIED. KRUPP AKTIENGESELLSCHAFT, OF ESSEN-ON-THE-RUHR, GERMANY

MULTIPLE-SPEED WHEEL GEAR

Application filed December 6, 1927, Serial No. 238,164, and in Germany December 6, 1926.

My invention relates to a change speed transmission gear in which the power is transmitted selectively by the one or the other of a plurality of transmission wheels being, when out of operation, loose on their shafts and adapted to be connected in driving relation with the said shafts by means of associated clutches. A main object of my invention is to provide for equal or similar conditions of power transmission in the several clutches. Other objects of my invention will be apparent from the following specification.

Figure 1:
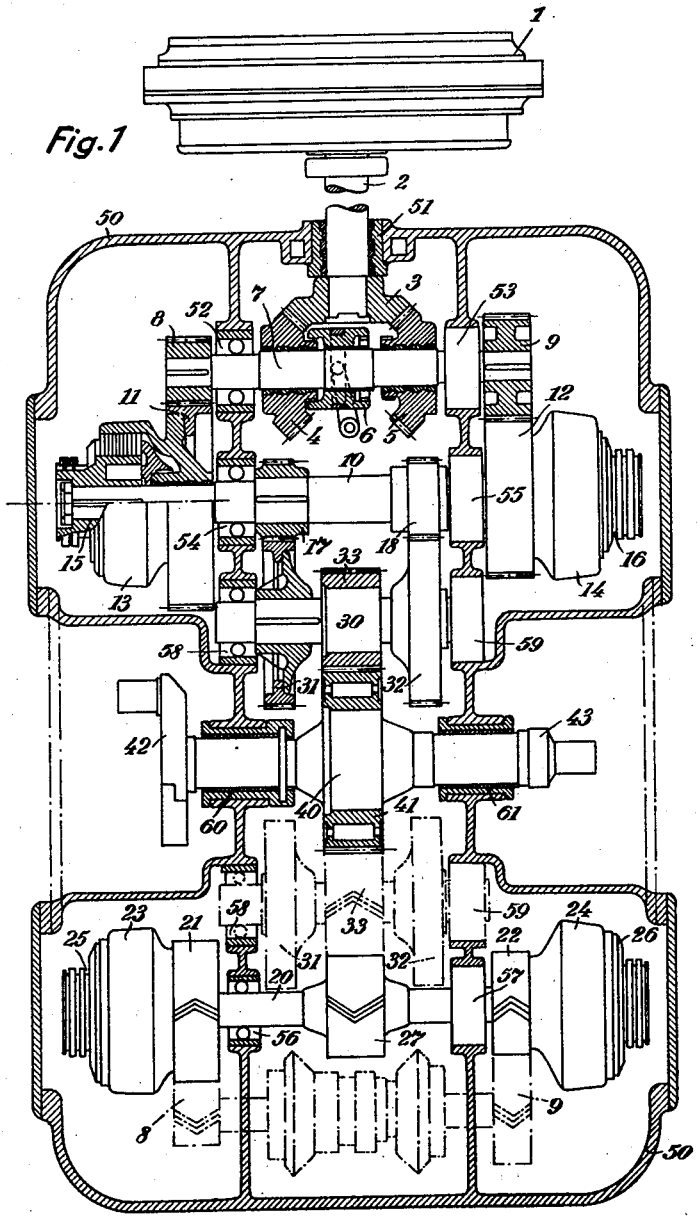
Figure 2:
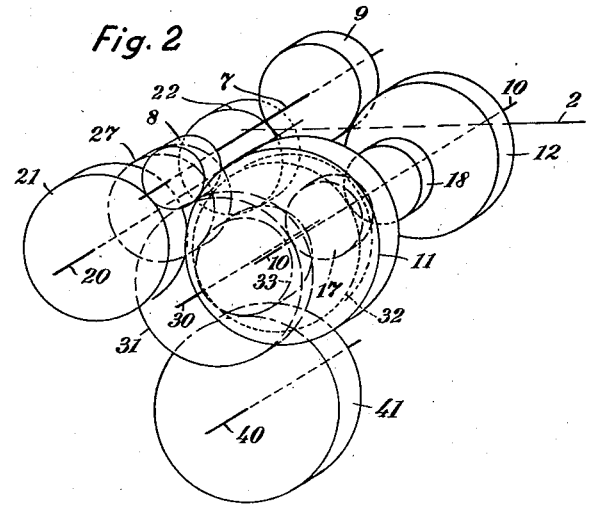
Figure 3:
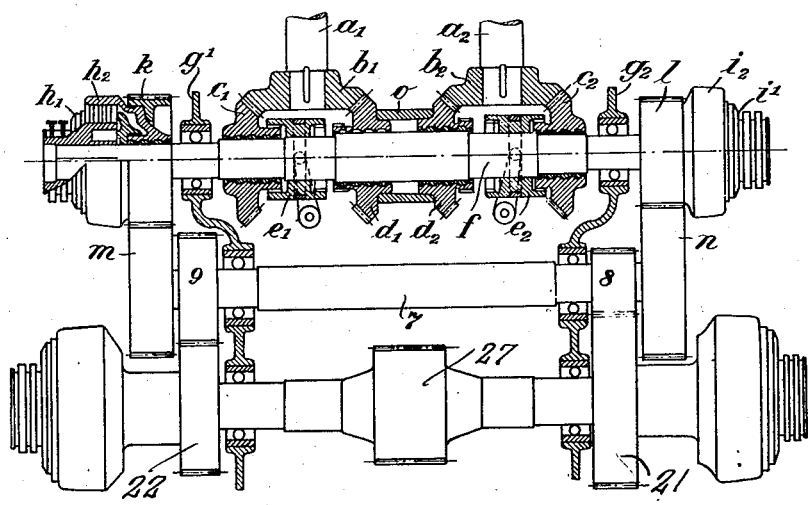

In the drawings Fig. 1 shows an embodiment of the new multiple speed wheel-gear laid out into a plane, the shafts which are shown therein in dash-dotted lines being duplicates of the other shafts;

Fig. 2 is a diagrammatical perspective view of the new wheel-gear with omission of the clutches and the bevel-gears, and Fig. 3 is a reverse detail sectional plan view of a modification of the improved transmission gear.

Referring now more particularly to the drawings, from the main clutch 1 the driving shaft 2 extends into the casing 50 of the multiple speed wheel-gear, a bearing 51 being provided in said casing for the reception of said shaft 2. The shaft 2 carries at its end a bevel-gear 3 which is permanently meshing with two bevel-gears 4 and 5 of even size. Said bevel-gears 4 and 5 are loosely mounted on the shaft 7 forming the first shaft of the wheel-gear and may be alternately coupled with a coupling 6, which is shown as being a claw-coupling. The members 3 to 6 form the reversing gear of the multiple speed wheel-gear, reversing being accomplished by alternately connecting either the bevel-gear 4 or the bevel-gear 5 with the shaft 7, this shaft being therefore rotatable in the one or other direction. The shaft 7 is mounted in two bearings 52 and 53 and carries at either of its ends a pinion 8 and 9, these pinions being of different diameters. The pinion 8 meshes with the two gear-wheels 11 and 21 which are loosely mounted upon the shafts 10 and 20, respectively. The other pinion 9 meshes with the two gear-wheels 12 and 22, which are likewise loosely mounted on the shafts 10 and 20, respectively. The rims of these two pairs of gear-wheels 11, 12 and 21, 22 are supported on the rotatable members of the clutches 13, 14 and 23, 24 respectively, said rotatable members being not keyed to the shafts 10 and 20. The second members of the clutches, viz. the members 15, 16 and 25, 26 are keyed to the shaft. If therefore one of the clutches 13—15 or 14—16 and one of the clutches 23—25 or 24—26 is thrown-in, one of the shafts 10 or 20 will be connected with one of the gear-wheels 11 or 12 or with one of the gear-wheels 21 or 22, said one of the gear-wheels serving now for the transmission of power. The shaft 10 is mounted in bearings 54 and 55 and the shaft 20 in bearings 56 and 57. Power is selectively transmitted from either shaft 10 or 20 to the shaft 30. The pinions 17 and 18 mesh with the gear-wheels 31 and 32, respectively, which are keyed to the shaft 30. From the shaft 30 power is transmitted to the gear-wheel 27 keyed to its shaft 20, said gear-wheel 27 meshing with the gear-wheel 33 which is likewise keyed to its shaft. The gear-wheel 33 further meshes with the gear-wheel 41 on the idle shaft 40. The shaft 30 is mounted in the bearings 58 and 59, and the idle shaft 40 is mounted in the bearings 60 and 61. From the idle shaft 40 now power will be transmitted to the driving wheels of the locomotive by means of the cranks 42 and 43. The operation of the device described will now be as follows:

By properly operating the four clutches, there will be four different rates of speed, said rates of speed being further divided into two groups, this being due to the arrangement of the two parallel shafts 10 and 20. By this the torques which are exerted on the shafts 10 and 20 may be kept approximately within the same limits, so that approximately the same forces will be exerted upon all gear-wheels and their clutches which are used in the multiple speed drive. The dimensions of all elements of the drive may therefore be kept small and the weights of the several elements and therewith the total weight of the entire wheel-gear may be reduced accordingly. The first speed employing the greatest ratio of gearing is produced by transmitting power from the smaller pinion 8 to the largest gear-wheel 11 used for changes of speed, the clutches 13—15 being then thrown-in, power being now transmitted from said gear-wheel 11 to the pinions 17—18 the gear-wheels 31—32 and by way of the gear-wheels 33 and 41 to the idle shaft 40. During this condition of operation of the multiple speed wheel-gear the speed of rotation of the idle shaft 40, and accordingly the speed of rotation of the main shaft, will be of smallest value. The first as well as the second speed, which latter may be obtained with the clutch 14—16 being thrown-in and the gears or pinions 9, 12, 17—18, 31—32 and 33, 41 is of no importance for the peripheral velocity of the clutch on the shaft 20 in no-load condition of said clutch. On the other hand, the peripheral velocities of the clutches on the shaft 10 will be increased when throwing-in the clutch elements serving for obtaining the fourth or highest speed, transmission of power in this case taking place from the larger pinion 9 to the smallest gear-wheel 22 used for operating the drive, thence to the gear-wheel 27 and by way of the gear-wheel 33 to the gear-wheel 41, the gear-wheel 33 in this case being only used as an intermediate member. The peripheral velocities and centrifugal forces which take place in this case may also be kept within reasonable limits by properly choosing the ratio of gearing at the pinions 8 and 9.

The same arrangement may also be used for a three-speed drive, one of the gear-wheels on the shaft 20 and one of the clutches being omitted in this case.

In order to obtain a still greater number of speeds with the multiple speed wheel-gear according to this invention there is provided an additional or intermediate transmission gear in front of the main wheel-gear, said additional transmission gear being a two-speed gear. A construction of this kind is shown in Fig. 3. As far as the transmission of torques and speeds according to Figs. 1 and 3 is concerned, there is no principal difference as regards those elements of the device which are arranged in the rear of the additional or intermediate transmission gear. For this reason this addition or intermediate transmission gear has been omitted in Fig. 3 and does not need to be further described herein. According to Fig. 3 power is transmitted from the two shafts $a1$ and $a2$ of a twin-motor to the two bevel-gears $b_1$ and $b_2$. These bevel-gears $b_1$ and $b_2$ are permanently meshing with a pair of bevel-gears $c_1$ and $d_1$ and $c_2$ and $d_2$, respectively, which are loosely mounted on the shaft $f$ forming part of said additional or intermediate transmission gear. By means of these bevel-gears the speed-changing drive may be converted into a reversing drive, the speed of the driving shafts $a_1$ and $a_2$ remaining unchanged. The drive will operate in the one or the other way, by connecting with each other either the bevel-gears $c_1$, $c_2$ or $d_1$, $d_2$ through the clutches $e_1$ and $e_2$. As the two motors rotate in synchronism with each other in opposite directions, the two shafts $a_1$ and $a_2$ will likewise rotate in opposite directions, while the two bevel-gears $d_1$ and $d_2$ will rotate in the same direction, as well as the two bevel-gears $c_1$ and $c_2$.

In order to attain synchronism between the two motors the two bevel-gears $d_1$ and $d_2$ are connected with each other by a bushing $o$, which serves for reducing occasional differences arising in the speeds of the shafts $a_1$ and $a_2$ to zero.

The bevel-gears $c_1$ and $c_2$ or $d_1$ and $d_2$, when thrown-in, will transmit the power of the driving shaft by way of the clutches $e_1$ and $e_2$ to the shaft $f$ which is mounted in the bearings $g_1$ and $g_2$. On the outside of these bearings there are provided on the shaft $f$ two further clutches the coupling members $h_1$ and $i_1$ thereof being keyed to the shaft $f$, while the other clutch members $h_2$ and $i_2$ are mounted loosely on said shaft, if the clutch is disengaged and carry the pinions $k$ and $l$ having different diameters. The pinion $k$ meshes permanently with the gear-wheel $m$, while the other pinion $l$ meshes permanently with the gear-wheel $n$, said two gear-wheels $m$ and $n$ being keyed to the shaft 7 exteriorly of the pinions 8 and 9. From these pinions power is transmitted to the idle shaft 40, as had above been described.

The drive according to this invention may be operated and the several speeds obtained as follows:

The first speed is obtained by throwing-in the clutches $h_1$—$h_2$ and 13—15. Transmission of power takes place from the shaft $f$ by way of the gear-wheels (or pinions) $k$—$m$, 8—11, 17—31 and 18—32 as well as 33—41 to the shaft 40.

The second speed is obtained by throwing-in the clutches $i_1$—$i_2$ and 13—15 and transmission of power takes place from the shaft $f$ by way of the gear-wheels (or pinions) $l$—$n$, 8—11, 17—31 and 18—32 as well as 33—41 to the shaft 40.

The third speed is obtained by throwing-in the clutches $h_1$—$h_2$ and 14—16 and transmission of power takes place from the shaft $f$ by way of the gear-wheels (or pinions) $k$—$m$, 9—12, 17—31 and 18—32 as well as 33—41 to the shaft 40.

The fourth speed is obtained by throwing-in the clutches $i_1$—$i_2$ and 14—16 and transmission of power takes place from the shaft $f$ by way of the gear-wheels (or pinions) $l$—$n$, 9—12, 17—31, and 18—32 as well as 33—41 to the shaft 40.

The fifth speed is obtained by throwing-in the couplings $h_1$—$h_2$ and 23—25. Transmission of power takes place from the shaft $f$ by way of the gear-wheels (or pinions) $k$—$m$, 8—21, 27—33—41 to the shaft 40.

The sixth speed is obtained by throwing-in the clutches $i_1$—$i_2$ and 23—25. Transmission of power takes place from the shaft $f$ by way of the gear-wheels (or pinions) $l$—$n$, 8—21 and 27—33—41 to the shaft 40.

The seventh speed is obtained by throwing-in the clutches $h_1$—$h_2$ and 24—26. In this case the transmission of power takes place from the shaft $f$ by way of the gear-wheels (or pinions) $k$—$m$, 9—22, 27—33—41 to the shaft 40.

The eighth speed is obtained by throwing-in the clutches $i_1$—$i_2$ and 24—26. In this case the transmission of power takes place from the shaft $f$ by way of the gear-wheels or pinions $l$—$n$, 8—21, 27—33—41 to the shaft 40.

Since the two gear-wheels $n$ and $m$ are also used by properly operating their clutches $i_1$—$i_2$ and $h_1$—$h_2$ in conjunction with all clutches of the multiple speed wheel-gear proper for the purpose of transmitting power from the driving shaft to the driving wheels of the locomotive, the ratio of gearing of the two pairs of gear-wheels $k$—$m$ and $l$—$n$ may be only slightly different, yet covering a great range of speeds. By this slight difference in the ratios of gearing the centrifugal forces will hardly be different, this being due to the slight differences in velocity; in addition to this, also the slip of the several parts will be only small for the same reason.

It has already been proposed to arrange the clutches outside the gear casing and the associated gear wheels in the interior of the said casing. In this case relatively long bushings connecting the clutches with the associated gear wheels become necessary, and such bushings are liable to become hot by taking up the friction heat. This disadvantage is obviated according to the invention by arranging also the gear-wheels associated with the clutches outside the casing.

I claim:

In a change speed transmission gear a gear casing having a main partition, a pinion shaft, a plurality of intermediate shafts, all of said shafts passing through the side walls of said main partition of the casing, two pinions on said pinion shaft, toothed transmission-wheels on said intermediate shafts, said transmission-wheels being, when out of operation, loose on said intermediate shafts, each of said pinions being simultaneously in mesh with a plurality of said transmission-wheels, clutches associated with said transmission wheels, and adapted to connect said wheels in driving relation with said intermediate shafts, and a driven shaft being in gearing connection with each of said intermediate shafts, the said pinions, transmission-wheels and associated clutches being arranged overhung on the exterior of the said main partition of the casing.

In testimony whereof I affix my signature.

WALTHER LINDNER.